United States Patent Office 3,440,771
Patented Apr. 29, 1969

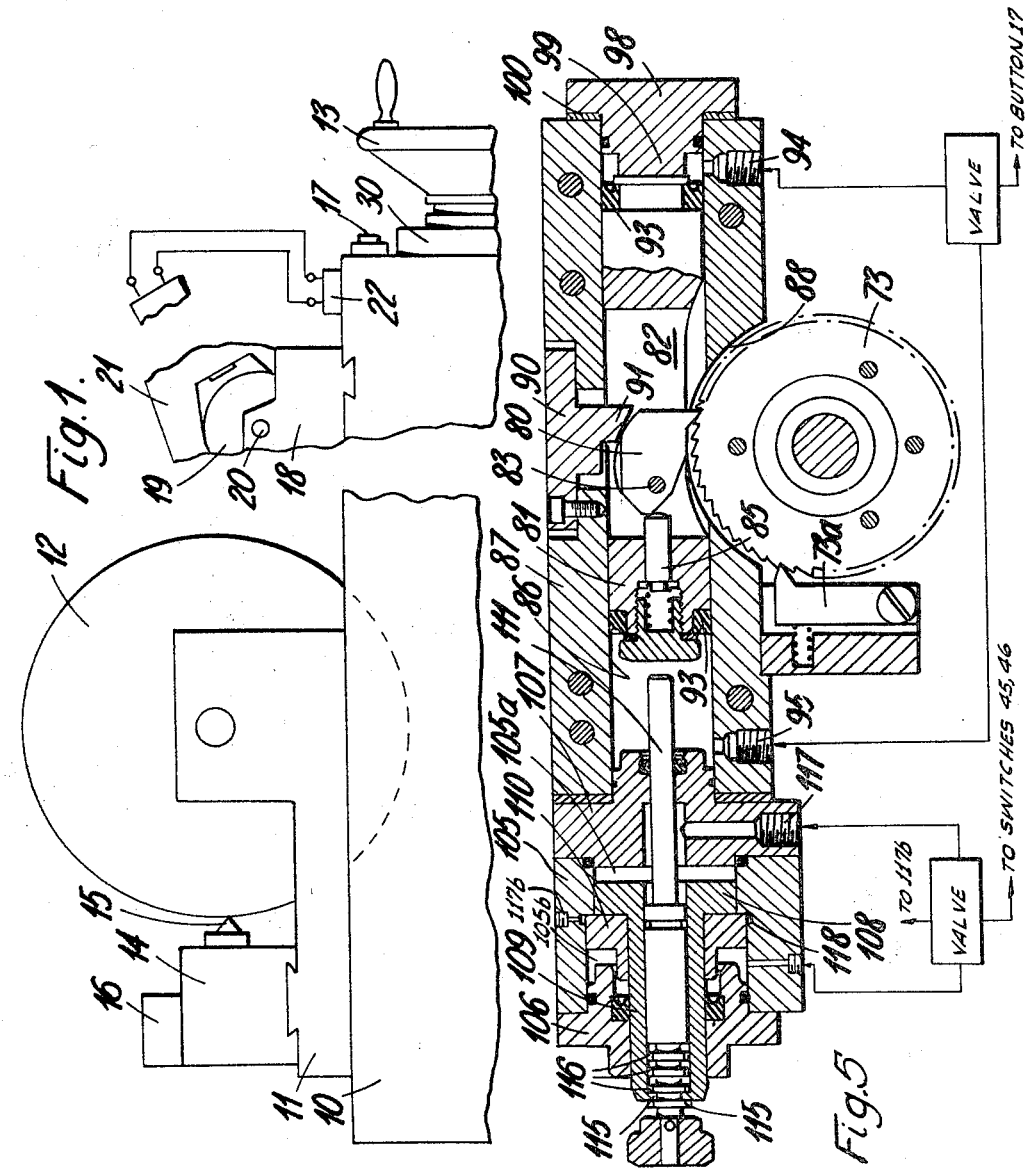

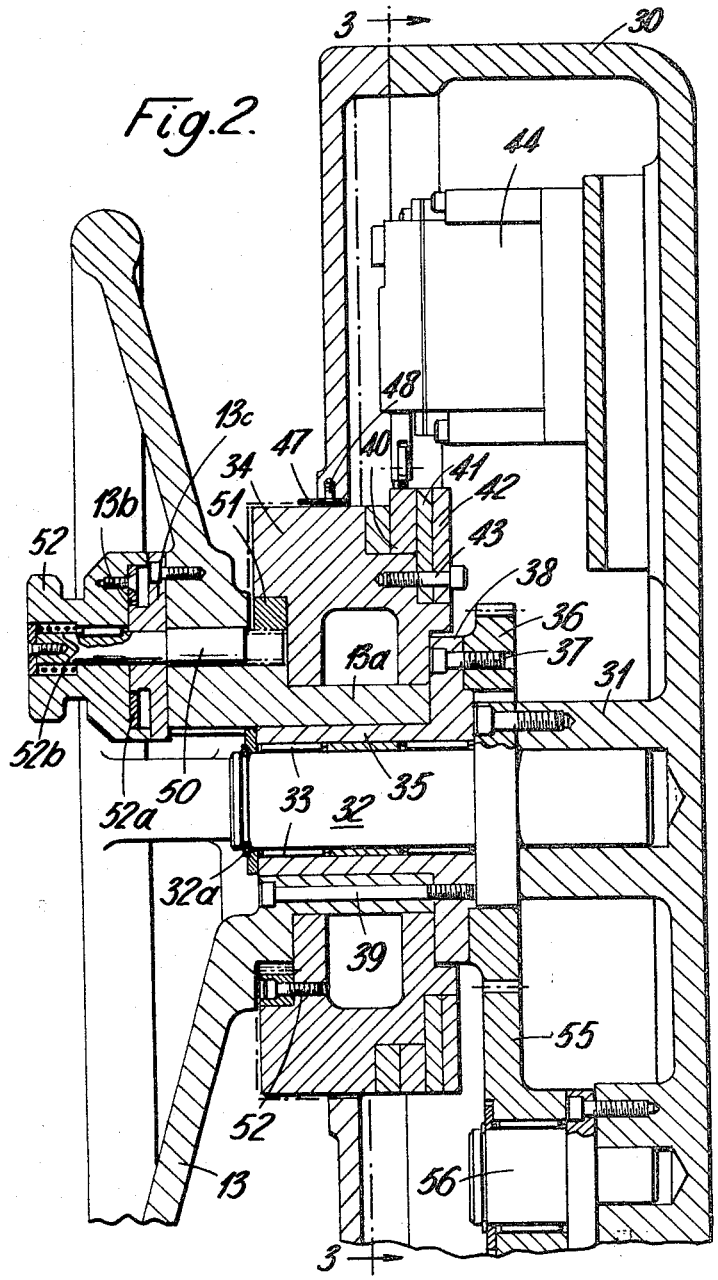

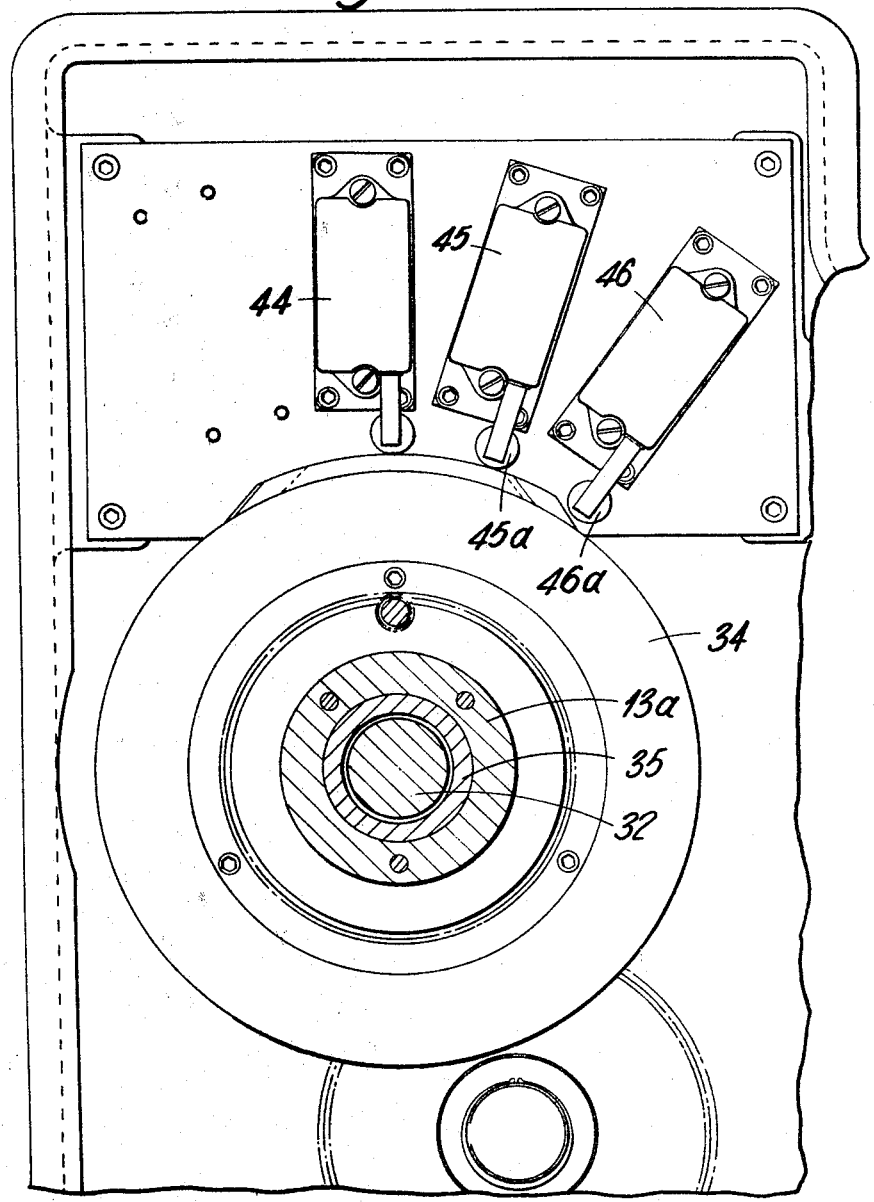

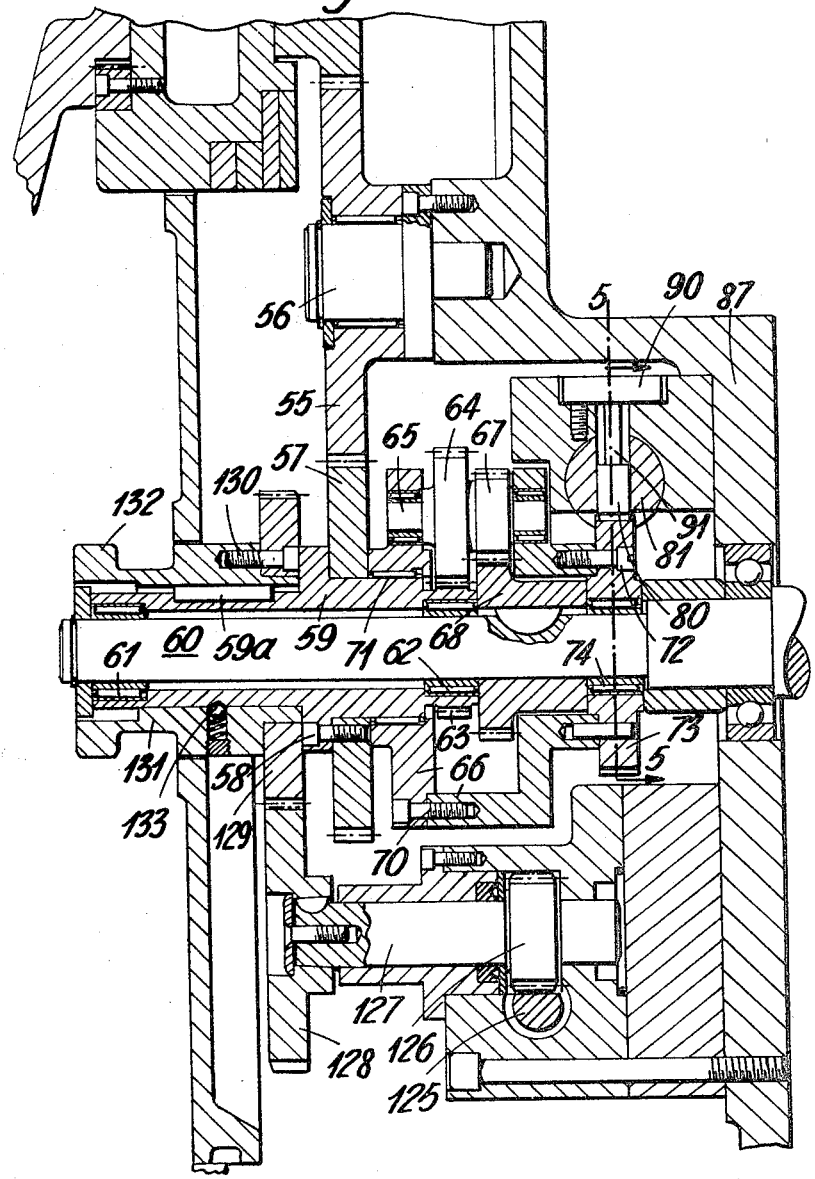

3,440,771
GRINDING MACHINES
Wilfred Keith Temple, Peterborough, England, assignor to The Newall Engineering Company Limited, Peterborough, England, a British company
Filed Dec. 20, 1965, Ser. No. 515,024
Int. Cl. B24b 49/00, 51/00
U.S. Cl. 51—165                    14 Claims

ABSTRACT OF THE DISCLOSURE

A grinding apparatus comprises relatively movable supports for the workpiece and the grinding wheel, feed mechanism for moving one of said supports relatively to the other, dimension responsive gauging means for measuring a dimension of the workpiece carried by the workpiece support and responsive to the attainment of said dimension to a predetermined value, means actuated by the dimension responsive means on attainment of the desired dimension for comparing with a datum position the position of said movable support, and automatic means for controlling the support moving means in response to the attainment of the desired dimension.

---

According to this invention there is provided grinding apparatus comprising a base, a support for a workpiece and a support for a grinding wheel which supports are mounted on the base, a feed mechanism for transmitting a feed to one of said supports for moving the wheel and workpiece relatively towards and away from each other, which mechanism comprises an input feed member, and a second feed member driven by the input feed member and drivingly connected to said one of the supports, gauging means operative to measure a dimension of a workpiece carried by the support and responsive to the attainment of said dimension to a predetermined value, which dimension varies as the workpiece is machined by the grinding wheel, means initiated by the dimension responsive means on attainment of the dimension to the predetermined value for comparing with a datum position the position of said one support or of a member of the feed mechanism for said one support, and automatic means for adjusting the position of the input feed member relative to the second feed member in a sense to cause the input feed member to be in a selected position relative to a fixed datum when said dimension attains the predetermined value.

According to the preferred feature of the invention said automatic means is adapted to alter the relative positions of the input and second feed members stepwise, the automatic means being initiated to alter said relative position by a predetermined amount if and when the position of the input feed member relative to the fixed datum differs from said selected position by more than a predetermined amount.

According to a further preferred feature of the invention said automatic means is adapted to alter said relative positions by an amount made up of an integral number of unit distances of adjustment.

According to another preferred feature of the invention the apparatus further comprises means for dressing the grinding wheel and means is provided for superimposing on said adjustment of the relative positions of the input feed member and the second feed member immediately after a dressing operation an additional correction to compensate for and proportional to the amount dressed off the wheel during the dressing operation.

A differential mechanism may conveniently drivingly couple the input feed member to the second feed member, said adjustment and, where appropriate, said correction being applied through the differential mechanism. In one such construction the differential mechanism includes two coaxial gears to which the input feed member and the second feed member are respectively secured and a planet cage carrying planetary gears which drivingly interconnect said coaxial gears, said automatic means being coupled to rotate the planet cage for applying said adjustment and, where appropriate, said correction.

According to yet another preferred feature of the invention the automatic means comprises a ratchet member coupled to the input feed member and the second feed member for adjusting the relative positions of these feed members, an oscillatory pawl for driving the ratchet, and an adjustable stop for governing the extent of oscillatory movement of the pawl, the position of which stop is controlled in dependence on the required adjustment of the relative position of said feed members. In one arrangement the pawl is mounted for rectilinear sliding movement relative to the ratchet member, and said stop is mounted on the line of movement of the pawl, and piston and cylinder means is provided for determining the position of the stop along the line of movement of the pawl. The apparatus may further comprise a carrier on which the stop is secured, and means for enabling the relative positions of the stop and the carrier to be adjusted along said line of movement, said piston and cylinder means being connected to the carrier for moving the stop along said line of movement.

According to still another preferred feature of the invention the comparing means comprises a plurality of switches each with an individual actuator, means for operating said actuators, the actuators and said means being mounted one to move with the input feed member and the other on the base, the switch actuators being disposed so that when said dimension reaches the predetermined value, one switch is operated by the operating means if the input feed member is a predetermined distance short of the datum position, two switches are operated if the input feed member is substantially at the datum position, and all three switches are actuated if the input feed member is a predetermined distance beyond the datum, the switches being interconnected with each other and with said automatic means to initiate an adjustment of the relative positions of the input and second feed members appropriate to the switch or switches actuated.

One embodiment of the invention will now be described by way of example with reference to the accompanying drawings in which:

FIGURE 1 shows diagrammatically a fragmentary general view of a grinding machine, FIGURE 2 shows a sectional elevation of the hand wheel and a part of the train driven by the hand wheel, FIGURE 3 shows a fragmentary sectional end elevation on the line 3—3 in FIGURE 2, FIGURE 4 shows a sectional elevation of another part of the train driven by the hand wheel, and FIGURE 5 shows a sectional elevation of the compensating mechanism on the line 5—5 in FIGURE 4.

Referring now to FIGURE 1 there is shown diagrammatically a grinding machine comprising a fixed based 10 on which a support 11 for a motor-driven grinding wheel 12 is mounted for sliding movement at right angles to the axis of the grinding wheel under the control of a hand wheel 13 or motor (not shown). The support 11 carries a compound slide 14 on which is mounted a dressing tool 15 which is operable by a control device 16 to perform a cycle of dressing operations on the grinding wheel. Actuation of the cycle is initiated by pressing a switch 17. A workpiece support 18 is slidably mounted on the base 10 for movement parallel to the axis of the grinding wheel and carries in known manner a workpiece 19 in journals 20, the workpiece being rotated by a motor, not shown. A gauge 21 is disposed in engagement with the periphery of the workpiece 19 and is arranged in known manner to transmit a signal to a control device 22 when the workpiece reaches the required diameter. Control device 22 then actuates withdrawal of the grinding wheel to enable the workpiece to be removed and a fresh workpiece to be installed.

Turning now to FIGURES 2, 3 and 4, a housing 30 for mounting on the front of the base 10 is shown and has an internal boss 31 having fixed therein a stub shaft 32 on which the hand wheel assembly is rotatably mounted through needle roller bearings 33. The hand wheel assembly comprises an outer drum 34 into a central aperture of which a projecting hub 13a on the hand wheel 13 fits from one end, a flanged inner hub 35 which fits into the hub 13a of the hand wheel from the opposite side of drum 34, and a ring gear 36 secured by screws 37 to the flange 38 of the inner hub 35. Drum 34, hand wheel 13 and the inner hub 35 are axially held together by screws 39, and the assembly is held on stub shaft 32 by a circlip 32a on the end of the stub shaft. The rear edge of drum 34 has a peripheral rebate and cam rings 41 and 42 are secured in the rebate by screws 43. Each of the cam rings 41, 42 has a radially raised portion (as shown in FIGURE 3), and the two raised portions are staggered relative to each other circumferentially. A scale is marked on the outer peripheral surface of the drum 34 and indicates feed distances of the grinding wheel in a direction towards and away from the workpiece in the usual manner. A datum pointer 47 is secured to the housing 30 adjacent the scale by screws 48.

Three switches 44, 45, 46 are disposed as shown within the housing 30. Switch 44 operates a steady (not shown) under the control of a cam 40 but is not relevant to the present invention. Switches 45, 46 have respective actuators operated by followers 45a, 46a which are respectively engaged by the raised portions of cam rings 41, 42. Cam rings 41, 42, and the switches 45, 46 are in this instance so disposed that switch 45 is actuated when the pointer 47 indicates .001″ on the scale and switch 46 is operated when the pointer 47 indicates +.001″ on the scale. Switches 45 and 46 are electrically interconnected with each other.

The position of drum 34 relative to the hand wheel about the axis of the hand wheel can be adjusted by means of a shaft 50 which is rotatably mounted in the boss of the hand wheel 13 about an axis parallel to but offset from the stub shaft 32. Shaft 50 has gear teeth at its inner end which mesh with internal gear teeth on a ring insert 51 secured by screws 52 in a rebate on the front face of the drum. A knob 52 is keyed to shaft 50 at its opposite end to enable shaft 50 to be rotated manually to adjust the relative angular positions of the hand wheel and drum. A first clutch member 13c is secured to the hand wheel between the hand wheel and knob 52 and has a ring of external serrations 13b, and a second clutch member 52a is secured within knob 52 and has a ring of internal serrations engaging serrations 13b. Whilst the knob 52 is in the position shown, it cannot be rotated relative to the hand wheel because the knob is clutched to the hand wheel. The knob 52 can however be pulled axially against the restraint of a spring 52b to disengage clutch member 52a from clutch member 13c to permit knob 52 to be rotated to perform the adjustment. When the knob is released the clutch members re-engage each other and hold the wheels 13 and drum 34 in the selected relative positions.

Ring gear 36, which is driven by the hand wheel 13, meshes with an idler pinion 55 mounted on a stub shaft 56 in the housing 30. Pinion 55 in turn meshes with a gear ring 57 which is secured by screws 58 on an elongated annular hub 59 which is rotatably mounted on a central feed screw spindle 60 through spaced needle roller bearings 61, 62. Spindle 60 drives the feed screw for the grinding wheel support 11 in known manner. At its inner end, hub 59 has a ring of gear teeth 63 constituting a sun gear and meshing with a planet gear 64 which is formed integrally with a shaft 65 rotatably mounted in a planet cage 66. A second planet gear 67 is formed integrally with the first planet gear 64 and shaft 65 and meshes with a pinion 68 mounted coaxially with and keyed to feed-screw spindle 60.

Planet cage 66 comprises two portions which are secured together by axially extending screws 70, and at one end is journaled on the elongated hub 59 through a roller bearing 71 and has secured to it at its other end by screws 72 a ratchet wheel 73 which is rotatably mounted on spindle 60 through a roller bearing 74. Ratchet wheel 73 is driven by a compensating mechanism which is shown in FIGURES 4 and 5.

Referring now to FIGURES 4 and 5, the compensating mechanism comprises a pawl 80 which is mounted on a reciprocable piston 81, and a stop mechanism which governs the stroke of piston 81 and consequently the rotation of ratchet wheel 73. Pawl 80 is disposed in a slot 82 in piston 81 and is rotatably mounted on a pivot pin 83 extending across the slot and carried by the piston. Pawl 80 is resiliently urged into engagement with the teeth on ratchet wheel 73 by a spring loaded plunger 85 which is mounted on piston 81 and engages the heel of the pawl. Piston 81 is slidably mounted in a bore 86 in a body 87 which is fixedly mounted within the housing 30. A slot 88 is cut in the cylinder wall to accommodate part of the periphery of ratchet wheel 73, and part of the piston 81 is cut away intermediate its ends to prevent interference between the piston itself and ratchet wheel 73. A member 90 is secured in a rebated aperture in the cylinder body 87 and has a portion 91 which projects into the slot in piston 81 and has an inclined face which is engaged by the back of the pawl as the piston 81 moves forward, so that the pawl is held in engagement with the teeth of ratchet wheel 73. Piston 81 is equipped with sealing rings 93 at its ends, and passages 94, 95 are formed in the cylinder body 87 for enabling pressure fluid to be supplied to and exhausted from each end of the cylinder for reciprocating the piston 81. A plug 98 is secured by screws (not shown) to the forward end of cylinder body 87 and has a portion 99 which projects into and seals the end of bore 86 and forms a stop to limit forward movement of piston 81. A distance piece 100 is disposed between the plug and the cylinder body and enables the forward end position of piston 81 to be adjusted if necessary.

The stop mechanism is secured to the opposite end of cylinder 87 in alignment with piston 81.

The moving parts of the stop mechanism are mounted in a casing which comprises a cylinder 105 and cylinder end members 106, 107. Cylinder 105 has a stepped bore, and a piston 108 is mounted in the smaller diameter portion of the bore and has an integral sleeve portion 109 which projects through and is slidably and sealingly mounted in a bore in end member 106. A piston 110 is slidably disposed in the larger diameter part of the bore of cylinder member 105 and is slidably mounted on the sleeve portion 109. Sleeve 109 forms a carrier for a stop rod 111, the forward end portion of which is reduced in diameter and extends slidably and sealingly through a central aperture in end member 107 into the bore 86. The end of sleeve 109 which projects from the casing has two opposite inwardly directed segmental lips 115, and the adjacent end portion of stop rod 111 has a series of peripheral grooves forming lands 116 between them, each land having two flats formed thereon, so that by rotating the stop rod 111 into the appropriate position each land can be drawn between lips 115. By subsequent rotation of stop rod 111 lips 115 can be engaged in one or other of the annular grooves to hold the stop rod in selected axial positions relative to the carrier.

A passage 117 is formed in the end member 107 to permit pressure fluid to flow into and out of the adjacent end 105a of the stepped bore. A similar passage 117a leads to the opposite end 105b of the stepped bore, and a third fluid passage 117b communicates with an annular groove 118 formed in the larger diameter portion of the bore at the step between the larger and smaller diameter portions. When fluid under pressure is supplied to both ends of the stepped bore pistons 108, 110 are moved into the positions shown because of the larger effective area of piston 110. When the left-hand end 105a of the stepped bore is connected to exhaust, and fluid under pressure is supplied through passage 117 and to annular groove 118, pistons 108, 110 move to the left from the position shown in the drawing, carrying the stop rod with them. When the two ends 105a, 105b of the bore are both in communication with exhaust, and pressure fluid is supplied to the annular groove 118, piston 108 and the stop rod 111 are moved to the right. The piston system thus provides three positions of rod 111.

Referring now to FIGURE 4 a toothed rack 125 is slidably mounted below spindle 60 in the housing 30 for movement at right angles to the axis of spindle 60 by a hydraulic motor (not shown). A pinion 126 mounted on a shaft 127 meshes with the rack and serves to drive a gear wheel 128 secured on the end of shaft 127. Gear wheel 128 is shown in mesh with a gear wheel 129 which is secured by screws 130 on a sleeve 131 surrounding and slidably keyed to the elongated hub 59. The end of sleeve 131 opposite gear wheel 129 projects from the housing and has a head 132 by which the sleeve can be manually pulled to move gear wheel 129 axially out of engagement with gear wheel 128. In the engaged position in which the sleeve 131 is shown in the drawings, the sleeve is resiliently located relative to the elongated hub 59 by a spring-loaded ball 133 mounted in the sleeve and engaging in a depression in the surface of hub 59. When sleeve 131 is so positioned, rack 125 transmits a drive to gear wheel 129 on sleeve 131 which in turn drives hub 59 through key 59a. Thus hub 59 can be driven from hand wheel 13 or alternatively can be driven automatically by rack 125.

In operation of the grinding machine, when the machine is set to grind a succession of like articles to a predetermined size, the hand wheel 13 is set relative to the drum 34 by means of knob 52 so that when each article reaches its predetermined size, the zero mark on the graduated scale on drum 34 is opposite the pointer 47. When a succession of similar workpieces are machined by a grinding wheel, accurate measurement of the distance between the support for the grinding wheel and the support for the workpiece shows that the distance is not always the same when the workpiece reaches the desired dimensions. That is, although correctly set for the first workpiece, the reading on the scale will eventually, after a number of articles have been ground, commence to fall short of or go beyond zero. There are several possible reasons for this variation. For example, the grinding surface of the wheel gradually becomes blunted or loaded with particles from the workpieces and this causes an increase in the forces acting between the work and the wheel which may in turn lead to deflections of the two supports away from each other, so that when the workpiece reaches its final size it may be found that the final supports are closer together than was the case when the wheel was sharp. Other factors which may influence the final reading of the scale are wear on the grinding wheel and differential expansion and contraction of parts of the mechanism with change of temperature. Such variations are reflected in the final reading on the scale on the drum. In the construction illustrated, this variation is compensated for by the mechanism illustrated in FIG. 5 operating in conjunction with the differential mechanism which interconnects the hand wheels 13 and the feed screw spindle 60. If, when gauge 21 detects that the workpiece has reached the predetermined size and operates device 22 to stop the forward feed, only switch 45 of the two switches 45, 46 will have been operated by its cam ring on the drum 34, and the actuation of switch 45 alone is arranged to operate a valve to cause pressure fluid to be supplied to both ends 105a, 105b of the stepped cylinder in the stop mechanism, so that the pistons 108, 110 remain in the central positions in which they are shown in FIG. 5. If however the zero mark on the drum 34 stops short of the pointer 47 by an amount greater than .001", then neither of switches 45, 46 is actuated and in this case, the valve is automatically operated to supply pressure fluid to the annular groove 118 and to connect the end spaces 105a, 105b in the stepped bore of the stop mechanism to exhaust, so that the piston 108 and stop rod 111 advance towards the piston 81 by an amount corresponding to one tooth of the ratchet wheel 73. If on the other hand when the gauge 21 stops the feed screw the scale on drum 34 has moved beyond the pointer 47 by an amount corresponding to .001" or more on the scale, switches 45, 46 are both actuated and their electrical interconnection is such that the valve is operated to connect the larger diameter end 105b of the stepped bore of the stop mechanism and the annular groove 118 to exhaust and to supply pressure fluid through the passage 117 to the smaller diameter end 105a of the bore so that pistons 108 and 110 are driven to the larger diameter end of the bore thus moving stop rod 111 to the left from its central position shown by an amount corresponding to one tooth of ratchet wheel 73.

In addition to the above described adjustments of the position of the stop rod 111, which are carried out automatically, rod 111 is set manually relative to sleeve 109 according to the amount which the dressing device 14 has been set to dress from the grinding wheel at each dressing operation. The setting of stop rod 111 for this purpose is such that one land 116 is disposed outside sleeve 109 for each .005" which the dressing device is set to cut off the radius of the grinding wheel at each dressing operation. The correction set on the compensating device by switches 44, 45, 46 during the operation of the machine is applied when a dressing operation is initiated by the operator of the machine. Button 17, the pressing of which initiates a dressing operation, is also connected to operate a valve which causes pressure fluid to be supplied through passage 94 into bore 86 and connects passage 95 to exhaust, and which then reverses the connections so that pressure fluid is supplied through passage 95, and passage 94 is connected to exhaust. Thus the piston 81 is first driven backward into engagement with the stop rod 111, pawl 80 running back over the teeth of the ratchet wheel 73, and is then driven forward until it abuts plug 98. During this forward movement pawl 80 carries the ratchet wheel round by an amount proportionate to the position of the stop rod 111.

A spring loaded detent 73a is pivotally mounted on the body 87 and engages the teeth of the ratchet wheel 73 to prevent wheel 73 from being carried backwards by the pawl 80 during the backward movement of piston 81. If pistons 108, 110 remain in their central positions, that is, if pointer 47 indicates a reading between —.001′ and +.001" on the scale on drum 34 when gauge 21 signals that the workpiece has reached the predetermined size, the correction applied to ratchet wheel 73 whilst a dressing operation is being carried out is proportional to the amount being dressed from the wheel. If the zero mark has passd .001" or more beyond the pointer, stop rod 111 is moved to the left by pistons 108 and 110 to increase the correction applied through ratchet wheel 23. If however the zero mark on the scale is short of pointer 47 by an amoust greater than .001" at this time, stop rod 111 is moved by piston 108 to the right by an amount corresponding to the pitch of the ratchet wheel teeth so that in effect this correction is set against the correction necessary by virtue of the dressing operation. Each tooth of the ratchet wheel represents a correction of .001" on the reading of the scale on drum 34. Thus the compensation operates to permit an error not greater than ±.001" on the scale.

In another more complex arrangement any correction is made immediately the necessity for the correction is detected i.e. before grinding of the next workpiece commences.

In another embodiment, not illustrated, the feed to the grinding wheel support is actuated by a hydraulic ram, and in this case the rod interconnecting the ram and the grinding wheel support comprises two parts which overlap each other, the degree of overlap being adjustable to vary the end position of the input feed member.

I claim:

1. Grinding apparatus comprising a base, a support for a workpiece and a support for a grinding wheel which supports are mounted on the base, a feed mechanism for transmitting a feed to one of said supports for moving the wheel and workpiece relatively towards and away from each other, which mechanism comprises an input feed member, and a second feed member driven by the input feed member and drivingly connected to said one of the supports, dimension responsive means operative to measure a dimension of a workpiece carried by the work piece support and responsive to the attainment of said dimension to a predetermined value, which dimension varies as the workpiece is machined by the grinding wheel, means initiated by the dimension responsive means on attainment of the dimension to the predetermined value for comparing with a datum position the position of said one support, and automatic means for adjusting the position of the input feed member relative to the second feed member in a sense to cause the input feed member to be in a selected position relative to a fixed datum when said dimension attains the predetermined value.

2. Grinding apparatus as claimed in claim 1, wherein said automatic means is adapted to alter the relative positions of the input and second feed members stepwise, the automatic means being initiated to alter said relative positions by a predetermined amount if and when the position of the input feed member relative to the fixed datum differs from said selected position by more than a predetermined amount.

3. Grinding apparatus as claimed in claim 1 wherein said automatic means is adapted to alter said relative positions by an amount made up of an integral number of unit distances of adjustment.

4. Grinding apparatus as claimed in claim 1, further comprising means for dressing the grinding wheel and wherein means is provided for superimposing on said adjustment of the relative positions of the input feed member and the second feed member immediately after a dressing operation an additional correction to compensate for and proportional to the amount dressed off the wheel during the dressing operation.

5. Grinding apparatus as claimed in claim 1, wherein a differential mechanism drivingly couples the input feed member to the second feed member, said adjustment and, where appropriate, said correction being applied through the differential mechanism.

6. Grinding apparatus as claimed in claim 5 wherein the differential mechanism includes two coxial gears to which the input feed member and the second feed member are respectively secured and a planet cage carrying planetary gears which drivingly interconnect said coaxial gears, said automatic means being coupled to rotate the planet cage for applying said adjustment and, where appropriate, said correction.

7. Grinding apparatus as claimed in claim 1, wherein the automatic means comprises a ratchet member coupled to the input feed member and the second feed member for adjusting the relative positions of these feed members, an oscillatory pawl for driving the ratchet, and an adjustable stop for governing the extent of oscillatory movement of the pawl, the position of which stop is controlled in dependence on the required adjustment of the relative position of said feed members.

8. Grinding apparatus as claimed in claim 7, wherein the rachet member is a rachet wheel.

9. Grinding apparatus as claimed in claim 8, wherein the pawl is mounted for rectilinear sliding movement relative to the ratchet member, and said stop is mounted on the line of movement of the pawl, a piston and cylinder means for determining the position of the stop along the line of movement of the pawl.

10. Grinding apparatus as claimed in claim 9, further comprising a carrier on which the stop is secured, means for enabling the relative positions of the stop and the carrier to be adjusted along said line of movement, said piston and cylinder means being connected to the carrier for moving the stop along said line of movement.

11. Grinding apparatus as claimed in claim 10, wherein the comparing means comprises a plurality of switches each with an individual actuator, means for operating said actuators, the actuators and said means being mounted one to move with the input feed member and the other on the base, the switch actuators being disposed so that when said dimension reaches the predetermined value, one switch is operated by the operating means if the input feed member is a predetermined distance short of the datum position, two switches are operated if the input feed member is substantially at the datum position, and all three switches are actuated if the input feed member is a predetermined distance beyond the datum, the switches being interconnected with each other and with said automatic means to indiate an adjustment of the relative positions of the input and second feed members appropriate to the switch or switches actuated.

12. Grinding apparatus as claimed in claim 2, wherein said automatic means is adapted to alter said relative positions by an amount made up of an integral number of unit distances of adjustment.

13. Grinding apparatus as claimed in claim 3, further comprising means for dressing the grinding wheel and wherein means is provided for superimposing on said adjustment of the relative positions of the input feed member and the second feed member immediately after a dressing operation an additional correction to compensate for and proportional to the amount dressed off the wheel during the dressing operation.

14. Grinding apparatus as claimed in claim 5, wherein the automatic means comprises a ratchet member coupled to the input feed member and the second feed member for adjusting the relative positions of these feed members, an oscillatory pawl for driving the ratchet, and an adjustable stop for governing the extent of oscillatory movement of the pawl, the position of which stop is controlled in dependence on the required adjustment of the relative position of said feed members.

References Cited

UNITED STATES PATENTS

| | | | |
|---|---|---|---|
| 1,779,807 | 10/1930 | Einstein | 51—165 |
| 2,812,623 | 11/1957 | Messerschmidt | 51—165 |
| 3,039,240 | 6/1962 | Balsiger | 51—165 |

LESTER M. SWINGLE, *Primary Examiner.*